United States Patent

Tsurutani et al.

(10) Patent No.: US 8,793,067 B2
(45) Date of Patent: Jul. 29, 2014

(54) ROUTE SEARCHING DEVICE (75) Inventors: Taisuke Tsurutani, Wako (JP); Koichiro Takemasa, Wako (JP); Yoshinori Aoki, Wako (JP); Kenichi Mineta, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 518 days.

(21) Appl. No.: 12/648,090

(22) Filed: Dec. 28, 2009

(65) Prior Publication Data

US 2011/0160993 A1 Jun. 30, 2011

(51) Int. Cl.
G01C 21/26 (2006.01)
G01C 21/32 (2006.01)
G01C 21/36 (2006.01)

(52) U.S. Cl.
USPC ............... 701/410; 701/123; 701/415

(58) Field of Classification Search
USPC ............ 701/22, 29.4, 50, 51, 54, 93, 95, 123, 701/200, 532, 56, 104, 33, 119, 301, 410, 701/415; 180/65.245, 165; 62/87, 239; 123/478
See application file for complete search history.

(56) References Cited

U.S. PATENT DOCUMENTS 5,913,917 A * 6/1999 Murphy ................. 701/123
6,005,494 A 12/1999 Schramm
7,274,987 B2 9/2007 Ishiguro
7,369,938 B2 5/2008 Scholl
7,512,486 B2 3/2009 Needham et al.
(Continued)

FOREIGN PATENT DOCUMENTS

JP 02-278116 11/1990
JP 05-203456 A 8/1993
(Continued)

OTHER PUBLICATIONS

U.S. Appl. No. 12/648,090, filed Dec. 28, 2009 (currently pending but not published).

(Continued)

Primary Examiner — Tuan C. To
Assistant Examiner — Isaac Smith
(74) Attorney, Agent, or Firm — Arent Fox LLP (57) ABSTRACT A route searching device according to an embodiment of the invention includes an estimated fuel consumption amount computing unit that computes an estimated fuel consumption amount of each interval constituting plural routes from a departure point to a destination and an optimum route selecting unit that selects a route in which a total of the estimated fuel consumption amount from the departure point to the destination is minimized. The estimated fuel consumption amount computing unit includes a cruise fuel consumption amount computing unit that computes a cruise fuel consumption amount for each interval by multiplying a distance of the interval and a fuel consumption rate determined according to an average vehicle speed a vehicle-speed fluctuation fuel consumption amount computing unit that computes a vehicle-speed fluctuation fuel consumption amount for each interval in each road category by multiplying the distance of the interval and the a fuel consumption rate, the fuel consumption rate being determined from an average vehicle speed and the road category of the interval and a gradient fuel consumption amount computing unit that computes a gradient fuel consumption amount for each interval by multiplying the distance of the interval and a fuel consumption rate determined according to a road average gradient. The estimated fuel consumption amount is obtained by adding the cruise fuel consumption amount, the gradient fuel consumption amount, and the vehicle-speed fluctuation fuel consumption amount.

7 Claims, 4 Drawing Sheets

(56) References Cited

U.S. PATENT DOCUMENTS

| | | |
|---|---|---|
| 2004/0230376 A1 | 11/2004 | Ichikawa et al. |
| 2007/0027593 A1* | 2/2007 | Shah et al. ............... 701/30 |
| 2007/0255477 A1* | 11/2007 | Okuda et al. ............. 701/93 |
| 2008/0125958 A1 | 5/2008 | Boss et al. |
| 2008/0133120 A1 | 6/2008 | Romanick |
| 2008/0221787 A1 | 9/2008 | Vavrus |
| 2008/0270021 A1 | 10/2008 | Yamada |
| 2008/0294339 A1 | 11/2008 | Tauchi et al. |
| 2009/0254266 A1 | 10/2009 | Altrichter et al. |
| 2010/0017110 A1 | 1/2010 | Sengoku et al. |
| 2010/0049397 A1* | 2/2010 | Liu et al. ................ 701/33 |
| 2010/0057339 A1 | 3/2010 | Pryakhin et al. |
| 2010/0076675 A1 | 3/2010 | Barth et al. |
| 2012/0029803 A1 | 2/2012 | Yasushi et al. |

FOREIGN PATENT DOCUMENTS

| | | | |
|---|---|---|---|
| JP | 10-197272 | | 7/1998 |
| JP | 10197272 A | * | 7/1998 |
| JP | 2003-166868 A | | 6/2003 |
| JP | 2005-017194 A | | 1/2005 |
| JP | 2005-098749 | | 4/2005 |
| JP | 2005-172582 | | 6/2005 |
| JP | 2005-172582 A | | 6/2005 |
| JP | 2006-003147 A1 | | 1/2006 |
| JP | 2006-098174 A | | 4/2006 |
| JP | 2006098174 A | * | 4/2006 |
| JP | 2009-079995 | | 4/2009 |
| JP | 2009-133779 A | | 6/2009 |
| JP | 2009-222519 A | | 10/2009 |
| JP | 2009-264935 A | | 11/2009 |

OTHER PUBLICATIONS

International Search Report and Written Opinion, mailed Feb. 22, 2011, from PCT Application No. PCT/JP/2010/007166.

Office Action mailed Jul. 25, 2012 in U.S. Appl. No. 12/648,090.

* cited by examiner

ROUTE SEARCHING DEVICE

BACKGROUND OF THE INVENTION

1. Field of the Invention

The present invention relates to a route searching device of a vehicle, more particularly to a route searching device that searches a running route whose fuel consumption amount is minimized when the vehicle runs from a departure point to a destination.

2. Description of the Related Art

For example, Japanese Patent Application Laid-Open No. 2-278116 discloses a navigation system. In the navigation system, a necessary time in each interval, a running distance, fuel consumption between intersections of the route to the destination are stored as a database in each run, and a maximum fuel consumption route is displayed from these pieces of data.

Japanese Patent Application Laid-Open No. 2005-98749 discloses a vehicle navigation system. In the vehicle navigation system, an energy consumption rate is estimated from four pieces of information. The four pieces of information include (a) static information (such as a running distance of each interval and road gradient) on the route, (b) dynamic information (such as a traffic status and a traffic signal status) on the route, (c) vehicle specifications (such as a type of a drive source and performance of the drive source), and (d) a driving characteristic of a driver.

Japanese Patent Application Laid-Open No. 2009-79995 discloses a route searching device. In the route searching device, a carbon dioxide emission amount (fuel consumption amount) of each link from the departure point to the destination is computed as the sum of a fuel consumption amount consumed in an idling state, a fuel consumption amount consumed during constant speed running, and a fuel consumption amount consumed by acceleration from a stopped state to a running state.

Japanese Patent Application Laid-Open No. 10-197272 discloses a vehicle navigation device. In the vehicle navigation device, a fuel consumption coefficient is set according to an urban road, a suburban road, or an expressway, and the fuel consumption coefficient is corrected according to a flat road, a rising gradient, or a falling gradient. An amount of fuel necessary to reach the destination is computed by the fuel consumption rate, the fuel consumption coefficient of each interval, and the running distance of each interval.

In the navigation system disclosed in Japanese Patent Application Laid-Open No. 2-278116, only the maximum fuel consumption route for the interval stored in the database can be searched, but the route cannot be searched when the vehicle runs in the interval that is not stored in the database.

In the vehicle navigation system disclosed in Japanese Patent Application Laid-Open No. 2005-98749, although the energy consumption rate is estimated from the four pieces of information, how to utilize the pieces of information to estimate the energy consumption rate is not specifically disclosed.

In the route searching device disclosed in Japanese Patent Application Laid-Open No. 2009-79995, although traffic jam information and road category are considered in computing the fuel consumption amount, how the road category reflects the computation is not specifically disclosed.

In the vehicle navigation device disclosed in Japanese Patent Application Laid-Open No. 10-197272, the set fuel consumption coefficient for the expressway is smaller than that for the urban road, and the fuel consumption coefficient is uniformly set to each interval. Therefore, the fuel consumption coefficient is not set according to the actual running state.

An object of the invention is to improve the problems of the inventions disclosed in Japanese Patent Application Laid-Open Nos. 2-278116, 2005-98749, 2009-79995, and 10-197272 to search a running route whose fuel consumption amount is minimized by accurately estimating the fuel consumption amount according to the actual running state when the vehicle runs from the departure point to the destination.

SUMMARY OF THE INVENTION

In accordance with an aspect of the invention, a route searching device that searches a vehicle running route is provided. The route searching device includes an estimated fuel consumption amount computing unit that computes an estimated fuel consumption amount of each interval constituting a plurality of routes from a departure point to a destination, and an optimum route selecting unit that selects a route in which a total of the estimated fuel consumption amount from the departure point to the destination is minimized.

The estimated fuel consumption amount computing unit includes a cruise fuel consumption amount computing unit that computes the cruise fuel consumption amount for each interval by multiplying a distance of the interval and a fuel consumption rate determined according to an average vehicle speed, a vehicle-speed fluctuation fuel consumption amount computing unit that computes the vehicle-speed fluctuation fuel consumption amount for each interval in each road category by multiplying the distance of the interval and a fuel consumption rate, the fuel consumption rate being determined from an average vehicle speed and the road category of the interval, and a gradient fuel consumption amount computing unit that computes the gradient fuel consumption amount for each interval by multiplying the distance of the interval and a fuel consumption rate determined according to a road average gradient.

The estimated fuel consumption amount is obtained by adding the cruise fuel consumption amount, the gradient fuel consumption amount, and the vehicle-speed fluctuation fuel consumption amount.

In the route searching device in accordance with the aspect of the invention, the estimated fuel consumption amount in each interval is computed while divided into the cruise fuel consumption amount, the vehicle-speed fluctuation fuel consumption amount, and the gradient fuel consumption amount, and the vehicle-speed fluctuation fuel consumption amount is computed in each road category. Accordingly, the difference of the vehicle-speed fluctuation due to the road category, which is not reflected in the conventional technique, is reflected in the computation of the estimated fuel consumption amount, so that the fuel consumption amount can be estimated with higher accuracy.

In the route searching device in accordance with the aspect of the invention, preferably the fuel consumption rate determined from the average vehicle speed and the road category of the interval for an expressway is larger than the fuel consumption rate for an urban road, and a difference of the fuel consumption rate between the urban road and the expressway increases with decreasing average vehicle speed.

Accordingly, the vehicle-speed fluctuation fuel consumption amount is computed while features of the expressway and urban road are reflected, so that the fuel consumption amount can accurately be estimated according to the actual running state.

In the route searching device in accordance with the aspect of the invention, preferably the gradient fuel consumption amount computing unit sets (i) the fuel consumption rate to a value that increases with increasing average gradient in each interval, (ii) the fuel consumption rate for the urban road smaller than that for the expressway in case of a rising gradient, and (iii) the fuel consumption rate for the urban road larger than that for the expressway in case of a falling gradient.

Accordingly, the gradient fuel consumption amount is computed while a vehicle speed pattern (fluctuation) changing according to one of the expressway and the urban road is reflected, so that the fuel consumption amount can accurately be estimated according to the actual running state.

Preferably the route searching device in accordance with the aspect of the invention further includes an air-conditioner fuel consumption amount computing unit that computes a fuel consumption amount of an air conditioner by multiplying an estimated running time in each interval and air-conditioner power consumption determined according to an ambient temperature. The estimated fuel consumption amount computing unit adds the fuel consumption amount of the air conditioner to the estimated fuel consumption amount.

Accordingly, the fuel consumption amount is estimated while the fuel consumption amount of the air-conditioner operation is added, so that the fuel consumption amount can accurately be estimated according to the actual running state (environment).

DESCRIPTION OF THE PREFERRED EMBODIMENT

Figure 1:
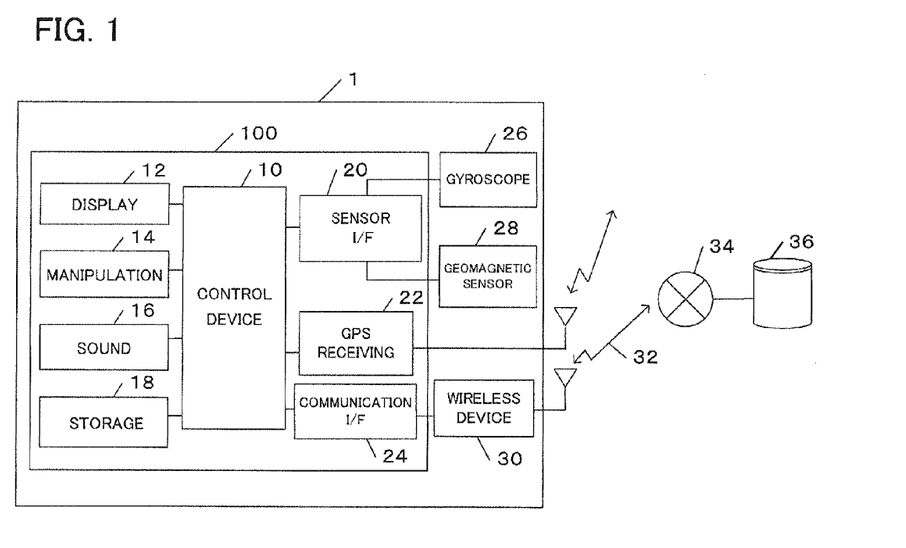
FIG. 1 is a block diagram illustrating a configuration of a route searching device according to an embodiment of the invention.

An embodiment of the invention will be described with reference to the drawings. FIG. 1 is a block diagram illustrating a configuration of a route searching device according to an embodiment of the invention.

A route searching device 100 in a vehicle 1 includes a control device 10, a display unit 12, a manipulation unit 14, a sound output unit 16, an information storage unit 18, a sensor interface (I/F) 20, a GPS receiving unit 22, and a communication interface (I/F) 24. The control device 10 is also called an Electronic Control Unit (hereinafter referred to as "ECU"), and the control device 10 is a kind of a computer including a Central Processing Unit (CPU) and a memory. The control device 10 performs various kinds of control. The detailed control device 10 is described later. The route searching device 100 may be formed as a navigation device or part of the navigation device.

The display unit 12 includes a display such as LCD. The display unit 12 can be formed by a display having a touch panel function. In such cases, part of a manipulation of the manipulation unit 14 is performed on the touch panel of the display unit 12. The manipulation unit 14 includes a button used to input information and a button used to select pieces of information displayed on the display unit 12. The sound output unit 16 includes a speaker, and the sound output unit 16 transmits guidance (instruction) from the control device 10 to a driver in the form of sound. A sound input function may be added to the sound output unit 16 in order to receive a speech-based instruction of the driver through a microphone.

The information storage unit 18 is realized by any storage unit (such as a storage medium, a semiconductor memory, and HDD). Map data necessary for the route searching is stored in the information storage unit 18. The map data includes data necessary to draw a map image on a display screen of the display unit 12. The map data also includes road data indicating information on a road connecting state. The road data includes attribute information indicating an attribute about each road. The attribute information includes information on a road category, a road shape, and a road gradient (including an average gradient).

Various parameters (including a table) necessary to compute an estimated fuel consumption amount are stored in the information storage unit 18. For example, the parameter includes a fuel consumption rate that is used to compute a cruise fuel consumption amount, a vehicle-speed fluctuation fuel consumption amount, and a gradient fuel consumption amount. The parameter also includes a parameter necessary to compute a fuel consumption amount of an air conditioner. The information storage unit 18 also acts as a memory in which various pieces of information received through the communication I/F 24 are stored.

In the invention, the fuel consumption amount includes not only a consumption amount of gasoline or kerosene used in an engine (internal combustion engine) but also an electric storage amount (electric power amount) of a battery used in a hybrid vehicle or an electric vehicle. Accordingly, for example, when the invention is applied to the electric vehicle, desirably the description is understood while the fuel consumption amount (rate) is replaced by a battery consumption amount (rate) or an electric power consumption amount (rate).

The sensor I/F 20 transmits a signal received from a gyroscope 26 and a geomagnetic sensor 28, which are mounted on the vehicle 1, to the control device 10. As with the GPS receiving unit 22, the gyroscope 26 and the geomagnetic sensor 28 transmit a signal for specifying a current position and an orientation of the vehicle to the control device 10. The GPS receiving unit 22 receives GPS signals including pieces of positioning data from plural GPS satellites in order to detect a vehicle absolute position from latitude and longitude information. The control device 10 computes the vehicle current position from the GPS signal.

The communication I/F 24 conducts network communication 34 or inter-vehicle communication through a wireless communication device 30 mounted on the vehicle 1. A communication network 36 is connected to information server 38 having various pieces of road information. Examples of the information server 38 include a road traffic information communication system (VICS) and an Internavi (service, provided by Honda Motor Co., Ltd., for a car navigation system user) information system. For example, information on an estimated average vehicle speed in each interval (link) is provided from VICS in addition to pieces of information on a traffic jam, construction, and a traffic restriction. For example, information of each road category and information such as a road average gradient in each interval (link) are provided from the Internavi information system. In the Internavi information system, a vehicle speed pattern of each interval can be obtained from a probe vehicle to compute an average vehicle speed of each interval. In the Internavi information system, the average vehicle speed is also stored as data in units of times of each interval or units of days of the week. In the embodiment, these pieces of data are obtained and utilized.

Figure 2:
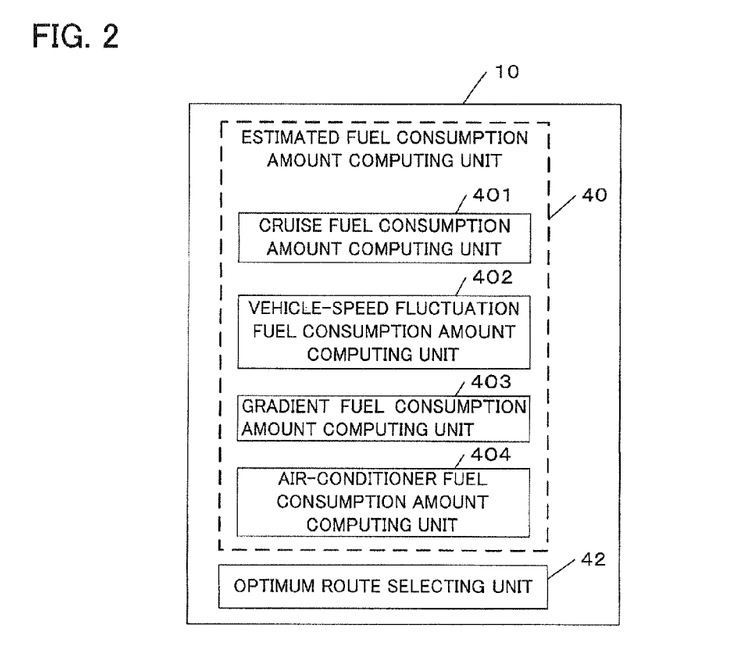
FIG. 2 is a block diagram illustrating a configuration of a control device of FIG. 1.

FIG. 2 is a block diagram illustrating a configuration (function) of the control device 10 of FIG. 1. The function of each block is realized by the computer (CPU) included in the control device 10. The configuration of the control device 10 may be incorporated in the navigation device.

The control device 10 includes an estimated fuel consumption amount computing unit 40 and an optimum route selecting unit 42. The estimated fuel consumption amount computing unit 40 computes the estimated fuel consumption amount of each interval constituting plural routes from a departure point to a destination when the vehicle runs from the departure point to the destination. The optimum route selecting unit 42 selects a route in which the total of estimated fuel consumption amounts from the departure point to the destination is minimized.

The estimated fuel consumption amount computing unit 40 includes a cruise fuel consumption amount computing unit 401, a vehicle-speed fluctuation fuel consumption amount computing unit 402 that computes a vehicle-speed fluctuation fuel consumption amount in each road category, a gradient fuel consumption amount computing unit 403, and an air-conditioner fuel consumption amount computing unit 404. The functions of the units 401 to 404 will be described below.

Figure 3:
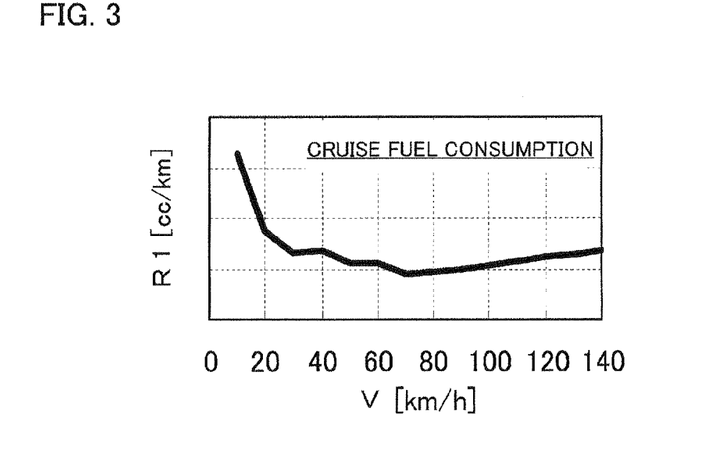
FIG. 3 illustrates a relationship between a vehicle speed and a fuel consumption rate.

The cruise fuel consumption amount computing unit 401 computes the cruise fuel consumption amount for each interval from the departure point to the destination by multiplying a distance of the interval and a fuel consumption rate determined according to the average vehicle speed. FIG. 3 illustrates a relationship between a vehicle speed V and a fuel consumption rate R1. The relationship of FIG. 3 is previously stored as a table in the information storage unit 18.

The control device 10 (401) obtains an estimated value Vp (km/h) of the average vehicle speed of each interval from the departure point to the destination from the information server 38 through the communication I/F 24, and the control device 10 stored the estimated value Vp in the information storage unit 18. The control device 10 obtains map data stored in the information storage unit 18 or obtains a distance L (km) of each interval from the information server 38. The control device 10 reads the table expressing the relationship of FIG. 3 from the information storage unit 18, and the control device 10 obtains the fuel consumption rate R1 (cc/km) corresponding to the obtained estimated value Vp of the average vehicle speed. The control device 10 computes a cruise fuel consumption amount A (cc) of each interval from an equation (1). The obtained cruise fuel consumption amount Q1 (cc) of each interval is stored in the information storage unit 18.

$$A = R1 \times L \tag{1}$$

The vehicle-speed fluctuation fuel consumption amount computing unit 402 that computes the vehicle-speed fluctuation fuel consumption amount of each road category for each interval from the departure point to the destination by multiplying the distance of the interval and a fuel consumption rate determined from the average vehicle speed and the road category of the interval. A parameter AE expressing energy changing according to a vehicle-speed fluctuation is introduced in computing the vehicle-speed fluctuation fuel consumption amount of each road category. The parameter AE expresses energy ($v^2$/km) per unit distance, which is consumed by acceleration when the vehicle makes a transition from the stopped state to the running state. The parameter AE increases when the vehicle stops intermittently due to a traffic jam or when the vehicle repeats often deceleration and acceleration.

Figure 4:
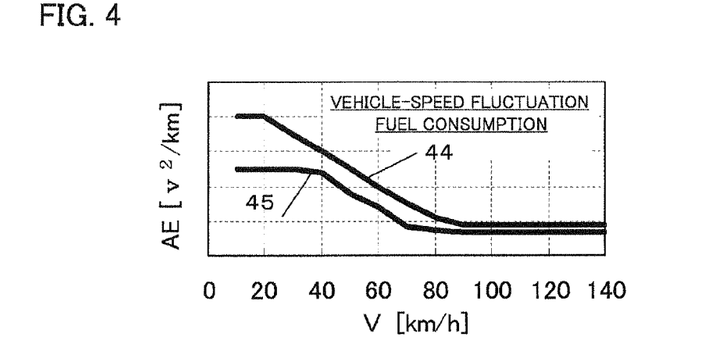
FIG. 4 illustrates a relationship between the vehicle speed and a parameter AE of vehicle-speed fluctuation energy.

FIG. 4 illustrates a relationship between the vehicle speed V (km/h) and the parameter AE ($v^2$/km). The relationship of FIG. 4 is previously stored as a table in the information storage unit 18. A graph 44 expressing the parameter AE on the expressway and a graph 45 expressing the parameter AE on the urban road are illustrated in FIG. 4. In FIG. 4, the parameter AE (44) on the expressway is larger than the parameter AE (45) on the urban road particularly in the low-speed region. The reason is attributed to the following matter. In the vehicle run on the expressway, the low-speed region is frequently the traffic jam interval, and the driver cannot see the front of the traffic jam. Therefore, the driver accelerates the vehicle when the distance between vehicles increases, and the driver decelerates the vehicle when the distance between vehicles decreases. On the other hand, in the vehicle run on the urban road, because the driver can see the traffic signal and the like to recognize the front status, the driver does not uselessly accelerate and decelerate the vehicle, and the parameter AE decreases relatively.

The embodiment has the feature that the parameter AE whose tendency depends on the road category is utilized. That is, the fuel consumption amount is computed by using the different parameters AE according to the expressway or the urban road in each interval.

The control device 10 (402) obtains a value of the parameter AE corresponding to the already-obtained estimated value Vp (km/h) of the average vehicle speed of each interval using the relationship of FIG. 4. At this point, the road category (for example, expressway or urban road) of each interval is obtained from the map data stored in the information storage unit 18, and the relationship (for example, graph 44 or 45) of the parameter AE is selected according to the road category.

The control device 10 computes a vehicle-speed fluctuation fuel consumption rate R2 (cc/km) in each interval from an equation (2) using the parameter AE:

$$R2 = \alpha \times AE \tag{2}$$

where coefficient $\alpha$ is an arbitrary constant.

The coefficient $\alpha$ decreases when engine efficiency or transmission efficiency of the vehicle increases, and the coefficient $\alpha$ increases when a weight of the vehicle increases. In the hybrid vehicle, the coefficient $\alpha$ increases when the number of regenerations increases during the deceleration.

The vehicle-speed fluctuation fuel consumption amount B (cc) of each road category in each interval from the departure point to the destination is obtained from an equation (3) using the fuel consumption rate R2 (cc/km) and the already-obtained distance L (km) of each interval. The obtained vehicle-speed fluctuation fuel consumption amount B (cc) of each interval is stored in the information storage unit 18.

$$B = R2 \times L \tag{3}$$

The gradient fuel consumption amount computing unit 403 computes the gradient fuel consumption amount for each interval by multiplying the distance of the interval and the fuel consumption rate determined according to the road average gradient. The gradient fuel consumption amount is obtained because an influence of the presence or absence of the road gradient is reflected, that is, the fuel consumption amount changes according to a rising gradient or a falling gradient compared with the vehicle run on the flat road. The data obtained from the information server 38 such as the Internavi information system is utilized as the road average gradient of each interval.

Figure 5:
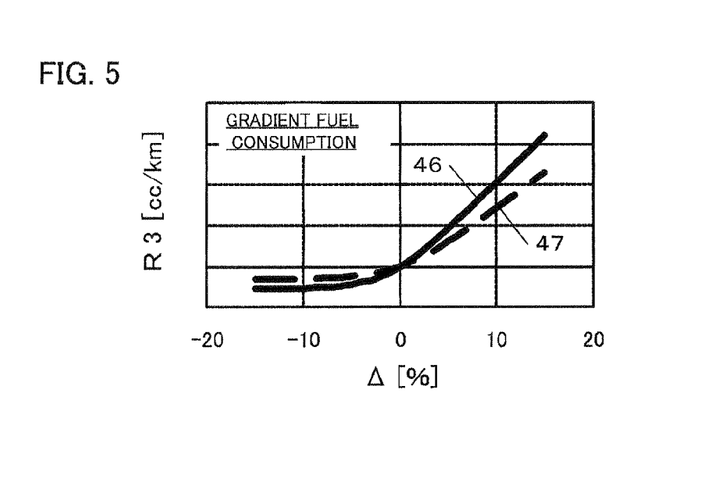
FIG. 5 illustrates a relationship between a road gradient and the fuel consumption rate.

FIG. 5 illustrates a relationship between a road gradient Δ (%) and a fuel consumption rate R3 (cc/km). The relationship of FIG. 5 is previously stored as a table in the information storage unit 18. A graph 46 expressing the fuel consumption rate R3 on the expressway and a graph 47 expressing the fuel consumption rate R3 on the urban road are illustrated in FIG. 5. In the rising gradient (positive percent), the fuel consumption rate R3 of the expressway is larger than that of the urban road. In the falling gradient (negative percent), the fuel consumption rate R3 of the urban road is slightly larger than that of the expressway. This is attributed to the following matter. The driver is required to run in the rising gradient of the expressway while largely pressing down the accelerator to maintain the speed not lower than a constant value (for example, 80 km/h or more). On the other hand, the driver is required to run in the falling gradient of the urban road while intermittently pressing down the brake to repeat the deceleration and the acceleration in order not to excessively enhance the speed.

The embodiment has the feature that the fuel consumption rate R3 whose tendency depends on the road category is utilized. That is, the different fuel consumption rates R3 are used according to the expressway or the urban road in each interval. The control device 10 (403) obtains the fuel consumption rate R3 corresponding to the obtained road average gradient Δ (%) of each interval using the relationship of FIG. 5.

The fuel consumption rate R3 can empirically be expressed by an equation (4):

$$R3=(a/b)\log(1+e^{b(x-c)})+d \tag{4}$$

where coefficients a, b, c, and d are arbitrary constants.

The coefficient "a" is a constant that increases in mainly proportion to the vehicle weight. The coefficient "a" changes the graph of FIG. 5 such that the graph of FIG. 5 comes close to a predetermined asymptotic line in the rising gradient (positive percent), and the coefficient "a" changes the graph of FIG. 5 such that the graph of FIG. 5 comes close to zero in the falling gradient (negative percent). The coefficient "b" is a constant that increases in proportion to the vehicle acceleration. The gradient of the graph of FIG. 5 increases with increasing coefficient "b", and the gradient of the graph of FIG. 5 decreases with decreasing coefficient "b". The coefficient "c" is a constant that decreases in proportion to a vehicle running resistance. The graph of FIG. 5 is translated rightward with increasing coefficient "c". The coefficient "d" is a constant that is set to zero when the gradient is zero. That is, the coefficient "d" means an intercept that is set such that the fuel consumption rate R3(0) becomes zero.

A gradient fuel consumption amount C (cc) of each interval from the departure point to the destination is obtained from an equation (5) using the fuel consumption rate R3 (cc/km) and the already-obtained distance L (km) of each interval. The obtained vehicle-speed fluctuation fuel consumption amount C (cc) of each interval is stored in the information storage unit 18.

$$C=R3 \times L \tag{5}$$

Figure 6:
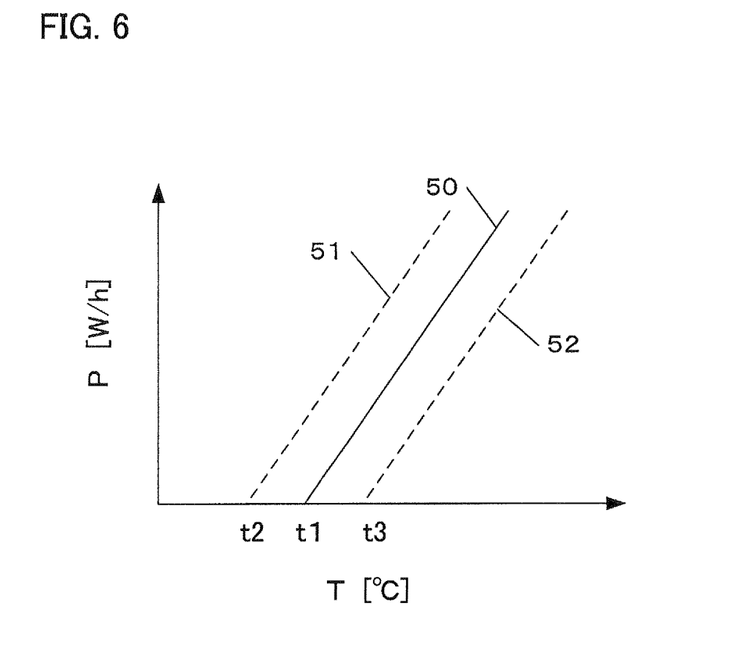
FIG. 6 illustrates a relationship between an ambient temperature and air-conditioner power consumption.

The air-conditioner fuel consumption amount computing unit 404 computes the fuel consumption amount of the air conditioner by multiplying the air-conditioner power consumption determined according to an ambient temperature and an estimated running time in each interval. FIG. 6 illustrates a relationship between an ambient temperature T (° C.) and air-conditioner power consumption P (W/h). In FIG. 6, graphs 50, 51, and 52 expresses the air-conditioner power consumptions P (W/h) when the use of the air conditioner starts at the ambient temperature T (° C.) of t1, t2, and t3. The relationship of FIG. 6 is previously stored as a table in the information storage unit 18.

The data obtained from the information server 38 such as the Internavi information system is utilized as the ambient temperature T (° C.) of each interval. The control device 10 (404) obtains the air-conditioner power consumption P (W/h) corresponding to the ambient temperature T (° C.) of each interval using the relationship of FIG. 6. At this point, because a temperature at which the air conditioner is operated changes according to an amount of solar radiation (weather), it is considered that the relationship (graph) of FIG. 6 changes according to the amount of solar radiation (weather). For example, it is assumed that the operation of the air conditioner starts at a temperature t1 in a cloudy day, in other words, the relationship of the graph 50 is utilized. In a sunny day, on the assumption that the operation of the air conditioner starts at a temperature t2 lower than the temperature t1, the air-conditioner power consumption P (W/h) is obtained by utilizing the relationship of the graph 51. Similarly, in a rainy day, the air-conditioner power consumption P (W/h) is obtained by utilizing the relationship of the graph 53. Therefore, the air-conditioner power consumption can be estimated in consideration of the weather.

The control device 10 (404) computes an estimated value D (cc) of the fuel consumption amount by the air-conditioner operation in each interval from an equation (6):

$$D=P \times TM \times f \tag{6}$$

Where TM is an estimated running time (TM=L/Vp) obtained from the distance L (km) in each interval and the estimated average speed Vp (km/h), and "f" is an coefficient that converts the air-conditioner power consumption P (W/h) into the fuel consumption amount (cc). The estimated value D (cc) of the fuel consumption amount can be estimated in each interval from the equation (6) on the assumption that the air conditioner is fully used during the estimated running time. The obtained estimated value D (cc) of the fuel consumption amount in each interval is stored in the information storage unit 18.

The optimum route selecting unit 42 of FIG. 2 selects the route in which the total of fuel consumption amounts of the intervals from the departure point to the destination is minimized. The fuel consumption amounts of the intervals from the departure point to the destination are stored in the information storage unit 18. At this point, the minimum-cost route is selected using a concept of so-called cost. In such cases, the cost is fuel amount (cc and W). The cost may be estimated as expense (such as yen, dollar or euro) by multiplying a fuel unit price and the fuel amount (power energy). Alternatively, the fuel amount may be converted into a carbon dioxide emission amount to estimate the carbon dioxide emission amount (cc) as the cost.

Figure 7:
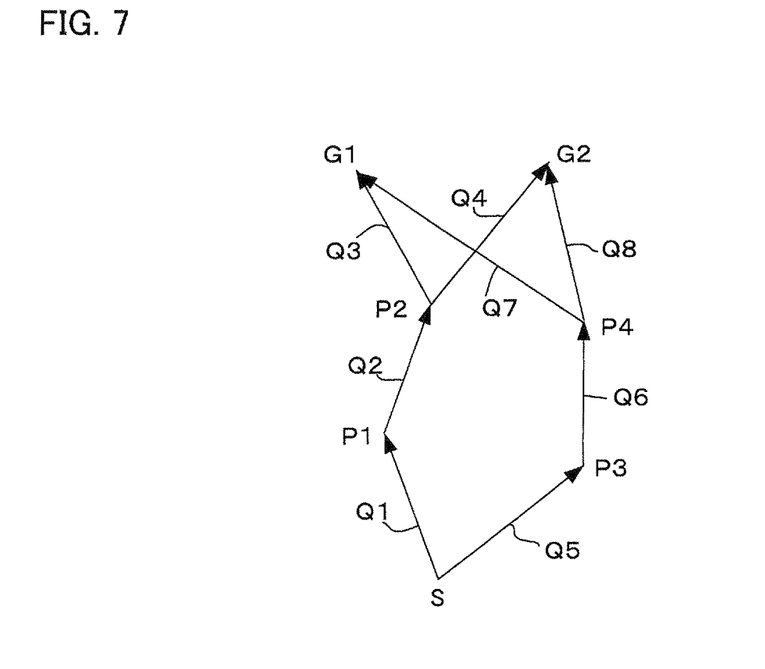
FIG. 7 is a view for explaining route selection.

FIG. 7 is a view for explaining route selection. In FIG. 7, it is assumed that the vehicle goes from a departure point S to one of two destinations G1 and G2 through the route in which the minimum fuel consumption amount is estimated. For example, the destinations G1 and G2 are points in which the similar facilities (such as a store or a park) are located. For the sake of convenience, only the intervals (links) divided by four points P1 to P4 are illustrated in FIG. 7. However, actually many passing points Pn and intervals (links) exist according to the distance to the destination.

The numerals Q1 to Q8 designate estimated fuel consumption amounts of the intervals, respectively. There are four routes from the departure point S to the destination G1 and G2, that is, a route R1 (S, P1, P2, and G1), a route R2 (S, P3, P4, and G1), a route R3 (S, P1, P2, and G2), and a route R4 (S, P3, P4, and G2). The total $\Sigma Q$ of estimated fuel consumption amounts is obtained for each route. For example, the total $\Sigma Q$ for the route R1 becomes $\Sigma Q = Q1+Q2+Q3$. The route in which the total $\Sigma Q$ becomes the minimum is selected. For example, when the route R3 is selected, the vehicle goes to the destination G2 through the route R3. As a result, the vehicle can go to the destination while the cost (fuel amount) is suppressed to the minimum.

When the cost is estimated as the expense (such as yen, dollar or euro), the route may be selected such that the whole expense in which a toll road fee is added to the fuel fee becomes minimum. At this point, a selection menu may be displayed on the display unit 14 in order to select the routes while a highest priority is given to one of the fuel amount, the fee, and the running time.

Figure 8:
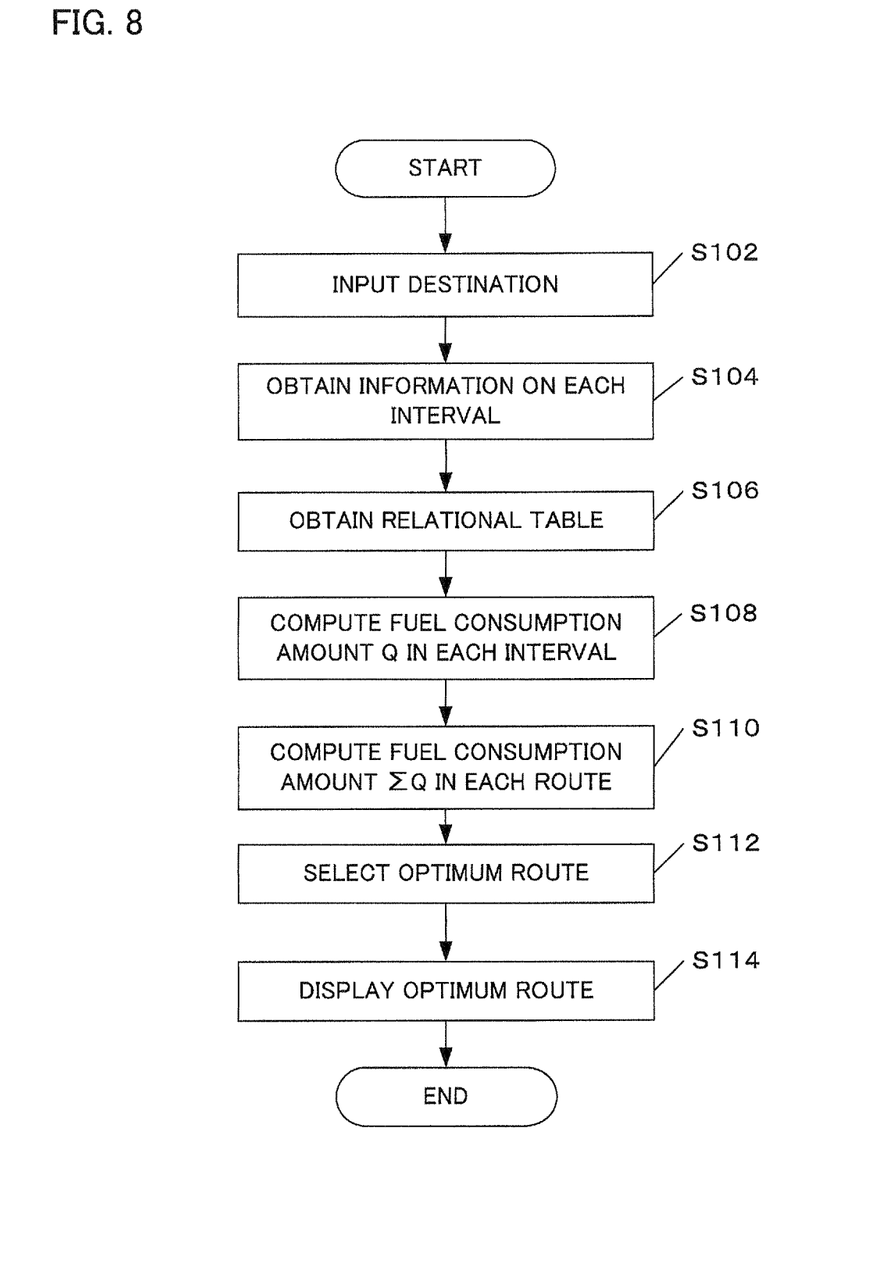
FIG. 8 illustrates a control flow performed by a control device.

FIG. 8 illustrates a control flow performed by the control device 10 of FIG. 1. The flow of FIG. 8 is executed by CPU incorporated in the control device 10. In Step S102, the destination is inputted through the manipulation unit 14. The control device 10 obtains the map information including plural routes to the destination from the information on the vehicle current position obtained from the GPS signal. In Step S104, various pieces of information on the intervals (links) of the route from the current position to the destination are obtained. As described above, the various pieces of information include the estimated value Vp (km/h) of the average vehicle speed in each interval, the distance L (km) of each interval, the road average gradient $\Delta$ (%) of each interval, the road category of each interval, and the ambient temperature T (° C.) of each interval. Each piece of information is obtained from the information storage unit 18 or the external information server 36 according to contents.

In Step S106, the relational table is obtained in order to compute the fuel consumption amount. The relational table includes the relationships of FIGS. 3 to 6 as described above. The relationship between the ambient temperature T (° C.) and the air-conditioner power consumption P (W/h) of FIG. 6 needs not to be obtained when obviously the air conditioner is not used. The relationships of FIGS. 3 to 6 may arbitrarily be selected by the manipulation unit 14.

In Step S108, the estimated value Q (=A+B+C+D) of the fuel consumption amounts of the intervals is computed and retained in the information storage unit 18. The method for computing the estimated value Q is already described. In Step S110, the total $\Sigma Q$ of estimated fuel consumption amounts is computed for each route from the departure point to the destination. The method for computing the total $\Sigma Q$ of estimated fuel consumption amounts is already described. In Step S112, the optimum route is selected. The optimum route is a route in which the total $\Sigma Q$ of estimated fuel consumption amounts becomes the minimum. In Step S114, the optimum route is displayed as part of the map information on the display unit 12. The driver can go to the destination through the optimum route with the minimum fuel consumption amount.

The embodiment is described by way of example, and the invention is not limited to the embodiment. Various modifications can be made without departing from the scope of the invention. Basically the invention can be applied to any vehicle that can conduct wireless communication with the information server.

In the embodiment, the control device 10 computes the cruise fuel consumption amount, the vehicle-speed fluctuation fuel consumption amount, and the gradient fuel consumption amount from the average vehicle speed and the average gradient, which are obtained from the information server 36. For example, the average vehicle speed and the average gradient are previously set to the information storage unit 18 in each interval (link), and each fuel consumption amount may be computed based on the average vehicle speed and the average gradient. Alternatively, the average vehicle speed and the average gradient may be set in each interval (link) from a past running history of the vehicle.

Alternatively, the cruise fuel consumption amount, the vehicle-speed fluctuation fuel consumption amount, and the gradient fuel consumption amount are computed in the information server 36, and these pieces of information may be obtained from the information server 36. Each fuel consumption amount may be computed in the information server based on the actual average vehicle speed and the average gradient, which are obtained from plural vehicles.

What is claimed is:

1. A route searching device that searches a vehicle running route, the route searching device comprising:
at least one processor configured to:
compute an estimated fuel consumption amount of each interval comprising a plurality of routes from a departure point to a destination;
calculate a total of the estimated fuel consumption amount from the departure point to the destination and select a route in which the total of the estimated fuel consumption amount is minimized;
compute a cruise fuel consumption amount for each interval by multiplying a distance of the interval and a cruise fuel consumption rate determined according to an average vehicle speed;
compute a vehicle-speed fluctuation fuel consumption amount for each interval based on the distance of the interval and an energy consumption rate for a road category of the interval, wherein the energy consumption rate is determined based on the average vehicle speed and the road category of the interval by using predetermined data indicating an energy consumption per unit distance as a function of an average vehicle speed for each road category;
compute a gradient fuel consumption amount for each interval by multiplying the distance of the interval and a gradient fuel consumption rate determined based on a road average gradient and the road category of the interval by using data indicating the gradient fuel consumption rate as a function of the road average gradient for each road category; and
calculate the estimated fuel consumption amount by adding the cruise fuel consumption amount, the gradient fuel consumption amount, and the vehicle-speed fluctuation fuel consumption amount.

2. The route searching device according to claim 1, wherein the vehicle-speed fluctuation fuel consumption rate for an expressway is greater than that for an urban road, and
a fuel consumption rate difference between the urban road and the expressway increases with decreasing average vehicle speed.

3. The route searching device according to claim 1, wherein the gradient fuel consumption rate is set to a greater value when the road average gradient increases, is set to a smaller value for the urban road compared to that for the express way in case of a rising gradient, and is set to a greater value for the urban road compared to that for the express way in case of a falling gradient.

4. The route searching device according to claim 1, wherein the processor is further configured to:
   compute a fuel consumption amount of an air conditioner by multiplying an estimated running time in each interval and air-conditioner power consumption determined according to an ambient temperature; and
   calculate the estimated fuel consumption amount by further adding the fuel consumption amount of the air conditioner to a sum of the cruise fuel consumption amount, the gradient fuel consumption amount, and the vehicle-speed fluctuation fuel consumption amount.

5. The route searching device according to claim 2, wherein the processor is further configured to:
   compute a fuel consumption amount of an air conditioner by multiplying an estimated running time in each interval and air-conditioner power consumption determined according to an ambient temperature; and
   calculate the estimated fuel consumption amount by further adding the fuel consumption amount of the air conditioner to a sum of the cruise fuel consumption amount, the gradient fuel consumption amount, and the vehicle-speed fluctuation fuel consumption amount.

6. The route searching device according to claim 3, wherein the processor is further configured to:
   compute a fuel consumption amount of an air conditioner by multiplying an estimated running time in each interval and air-conditioner power consumption determined according to an ambient temperature; and
   calculate the estimated fuel consumption amount by further adding the fuel consumption amount of the air conditioner to a sum of the cruise fuel consumption amount, the gradient fuel consumption amount, and the vehicle-speed fluctuation fuel consumption amount.

7. The route searching device according to claim 1, wherein the gradient fuel consumption rate has a value determined at least based on a vehicle weight, vehicle acceleration and deceleration, and a vehicle running resistance.

* * * * *